Sept. 27, 1966    N. S. WILLIAMS    3,274,910
SUNSHADE FOR CAMERA
Filed July 14, 1964
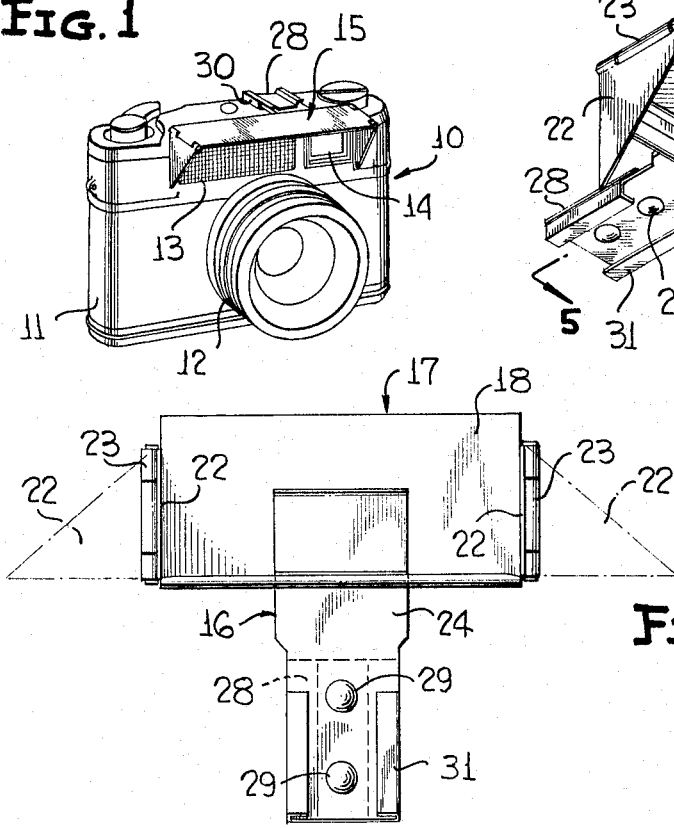
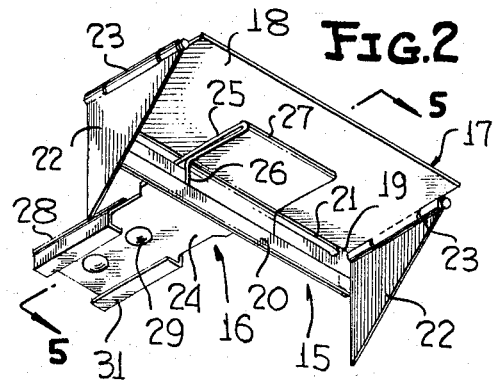
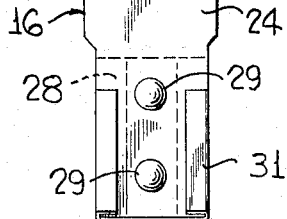
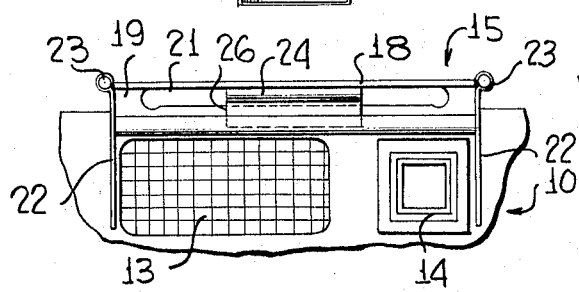
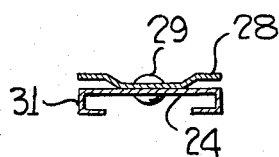
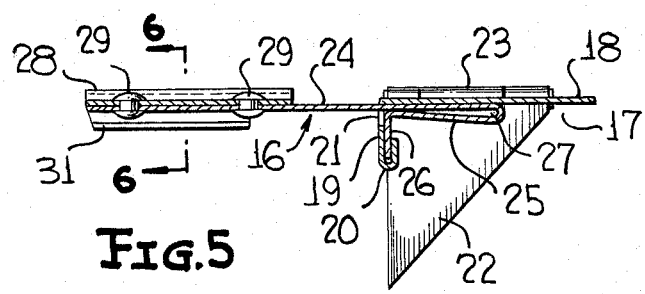
INVENTOR
NEIL S. WILLIAMS
BY Mason, Porter, Diller & Stewart
ATTORNEYS

United States Patent Office 3,274,910
Patented Sept. 27, 1966

3,274,910
SUNSHADE FOR CAMERA
Neil S. Williams, 1345 7th St. S., Fargo, N. Dak.
Filed July 14, 1964, Ser. No. 382,457
4 Claims. (Cl. 95—11)

This invention relates in general to new and useful improvements in cameras, and more particularly to a novel sunshade for a camera exposure meter.

A camera is constructed in a manner whereby when a photograph of a subject is being taken, the light entering into the lens of the camera is preferably reflected light with direct light being avoided whenever possible. However, when an exposure meter is built directly into the camera and opens at the front face of the camera, the exposure meter not only receives reflected light, but also a certain percentage of direct light. Thus, the exposure meter does not provide a true reading and in many instances the resultant photograph is underexposed.

At the present time correct readings may be obtained with cameras having built-in exposure meters by (1) holding the camera close to the subject, (2) pointing the camera down so that direct sunlight does not strike the exposure meter, and (3) shading the exposure meter in some manner.

It will be readily apparent that all of the foregoing methods of obtaining correct readings are undesirable in that the direct sunlight should be excluded without the taking of devious action by the user of the camera. To this end, it is the primary object of this invention to provide a novel sunshade for cameras which may be readily installed on existing cameras with a minimum of effort.

Another object of this invention is to provide a novel sunshade attachment for cameras, which sunshade attachment includes a support which is radially releasably secured to a conventional type of mounting fitting which may either be provided on a conventional camera or which may be readily placed thereon.

Another object of this invention is to provide a novel sunshade attachment for cameras which includes a support and a shade member, the shade member being adjustably mounted on the support whereby it may be properly positioned with respect to the exposure meter of the camera.

Still another object of this invention is to provide a novel sunshade for cameras which includes a generally horizontal shade member having flaps hingedly connected at opposite ends thereof and being movable from positions overlying the horizintal sunshade element to depending positions to define side flaps.

A further object of this invention is to provide a novel sunshade for cameras which will not only shade the exposure meter of a camera against direct exposure to sunlight, but which also will shade the viewer of the camera.

A still further object of this invention is to provide a camera of the type having a built-in exposure meter, the camera also having a sunshade projecting forwardly from the body of the camera in overlying relation to the exposure meter so as to shade the exposure meter from the direct rays of the sun.

With the above and other objects in view that will hereinafter appear, the nature of the invention will be more clearly understood by reference to the detailed description, the appended claims and the several views illustrated in the accompanying drawings.

In the drawing:

FIGURE 1 is a front perspective view of a conventional type of camera having a built-in exposure meter, the camera also being equipped with the sunshade which is the subject of this invention.

FIGURE 2 is an enlarged bottom perspective view of the sunshade of FIGURE 1 and shows more clearly the details thereof.

FIGURE 3 is a plan view of the sunshade, the side flaps being shown in horizontally extended positions by phantom lines.

FIGURE 4 is an enlarged fragmentary front elevational view of the camera of FIGURE 1 and shows the specific relationship of the sunshade with respect to the exposure meter and view finder of the camera.

FIGURE 5 is an enlarged fragmentary longitudinal sectional view taken along the line 5—5 of FIGURE 2 and shows more specifically the details of the connection between the support and the shade member of the sunshade.

FIGURE 6 is an enlarged fragmentary transverse vertical sectional view taken along the line 6—6 of FIGURE 5 and shows the details of the supports which facilitate the attachment thereof to a camera.

Referring now to the drawings in detail, it will be seen that there is illustrated in FIGURE 1 a camera of a conventional type, the camera being generally referred to by the numeral 10. The camera 10 includes a housing or a body 11 which has projecting from the forward wall thereof a lens holder 12. The illustrated camera 10 is provided with an exposure meter 13 and a view finder 14. It will be readily apparent that the exposure meter 13 is so positioned whereby direct rays from the sun will strike the exposure meter and give an incorrect reading as to the light on the subject being photographed. In order to prevent the undue influence of direct rays of sunshine on the exposure meter 13, the camera 10 is illustrated as being equipped with a sunshade which is generally referred to by the numeral 15. The sunshade illustrated in the drawing is in the form of an attachment for the camera 10 and is removable therefrom. The sunshade 15 is formed primarily of a support 16 and a shade member 17. The shade member 17 includes an upper shade element 18 which is horizontally disposed and which is provided along the rear edge thereof with a depending flange 19. The flange 19 terminates at its lower edge in an upwardly opening hook portion 20. The flange 19 is provided with an elongated slot 21 and extends generally parallel to the shade element 18.

The shade member 17 also includes a pair of side flaps 22. Each of the side flaps 22 is connected to an associated end of the shade element 18 by means of a hinge 23. The side flaps 22 are triangular in outline and are swingable from depending positions shown in FIGURE 2 to stored positions overlying the shade element 18.

The support 16, as is best shown in FIGURES 2 and 5, includes an elongated arm 24 which is provided at the forward end thereof with a reversely folded forward portion 25. The forward end of the support 24 is in the form of a depending terminal flange 26.

It is to be noted that the terminal flange 26 is received within the hook portion 20 and is retained therein by the engagement of the reversely folded portion 25 with the underside of the shade element 18. It is to be understood that the support 16 is formed of a resilient metal and since the reversely folded portion 25 has an intermediate bight portion 27, the folded portion 25 has a tendency to open up and thus the terminal flange 26 is continuously forced into the hook portion 20.

In FIGURE 2 it is clearly illustrated that the width of the arm 24 is less than the length of the slot 21. As a result, the shade member 17 may be adjusted relative to the arm 24 transversely thereof.

It is to be noted that the rear portion of the arm 24 is of a reduced width and is changed from its flat configuration to a generally closed channel configuration. In addition, the rear end of the arm 24 has secured thereto an attachment member 28 by means of rivets 29. The attachment member 28 is in the form of a short length of a winged channel. The winged channel attachment member 28, together with the closed channel configuration of the rear end of the arm 24 provides a suitable cross section, which is shown in FIGURE 6, for engagement with a conventional type of fitting 30 which may be mounted on the top of the camera 10 if the camera 10 is not provided with such an adapter fitting.

When it is desired to utilize the sunshade 15, the support 16 is merely snapped into engagement with the fitting 30 which is also of a closed channel configuration of a dimension to receive the closed channel rear portion of the arm 24, the rear portion being referred to by the numeral 31. The sunshade member 17 is then adjusted transversely of the camera 10 to the proper position with respect to the exposure meter 13. When the camera is of the type wherein the view finder is disposed immediately adjacent to the exposure meter, then the sunshade will be positioned to overlie both the exposure meter and the view finder.

It will be readily apparent that since the side flaps 22 are hingedly connected to the shade element 18 and may be swung into overlying relation to the shade element 18, the sunshade 15 is relatively compact and may be readily stored in one's gadget bag or other convenient place.

It is also to be noted that in new camera constructions, the sunshade can be built into the camera. When this is done, the sunshade may be of a more compact construction. For example, it may consist solely of the shade element 18 and the side flaps 22 with the rear edge of the shade element 18 being hingedly connected to the camera body or housing above the exposure meter and being foldable down into overlying relation with respect to the exposure meter when not in use. Thus, the sunshade can double as a protective covering for the exposure meter.

Although only a preferred embodiment of this invention has been specifically illustrated and described herein, it is to be understood that other modifications may be made therein within the spirit and scope of the invention, as defined by the appended claims.

I claim:
1. A sunshade attachment for conventional cameras of the type having a built-in exposure meter, a sunshade attachment comprising a shade member, said shade member including an upper horizontal shade element, a depending flange at a rear edge of said shade element terminating in an upstanding hook formation, an elongated slot in said depending flange extending lengthwise of said depending flange, and a support for mounting said shade member on a camera, said support including an elongated arm having a reversely folded forward portion terminating in a depending terminal flange, said arm extending through said slot and said terminal flange being seated in said hook formation with said reversely folded portion being disposed beneath said shade element, said arm being narrower than said slot whereby adjustment of said shade member transversely of said arm may be accomplished.

2. The sunshade attachment of claim 1 wherein the reversely folded portion is in the form of a spring to resiliently hold said terminal flange in said hook formation.

3. The sunshade attachment of claim 1 wherein said sunshade member includes a pair of flaps hingedly secured to opposite ends of said sunshade.

4. The sunshade attachment of claim 1 wherein said support has means for releaseable attachment to a camera at the end thereof remote from said sunshade member.

References Cited by the Examiner

UNITED STATES PATENTS

| 2,145,793 | 1/1939 | Hineline | 88—1 X |
| 2,213,942 | 9/1940 | Riszdorfer | 95—10 |
| 3,015,999 | 1/1962 | Kaden | 95—10 X |
| 3,048,090 | 8/1962 | Rentschler | 95—10 |

FOREIGN PATENTS

| 677,165 | 8/1952 | Great Britain. |
| 60,135 | 6/1912 | Switzerland. |

JOHN M. HORAN, *Primary Examiner.*